United States Patent [19]

Daniel

[11] 4,431,042

[45] Feb. 14, 1984

[54] ANTISKID TIRE CHAIN

[75] Inventor: Gordon W. E. Daniel, Mandal, Norway

[73] Assignee: Nørsk Kjettingindustri A-S Alf Nøsted, Mandal, Norway

[21] Appl. No.: 359,836

[22] Filed: Mar. 19, 1982

[30] Foreign Application Priority Data

Mar. 19, 1981 [NO] Norway ................................. 810939
Feb. 22, 1982 [NO] Norway ................................. 820546

[51] Int. Cl.³ ............................................. B60C 27/00
[52] U.S. Cl. ................................. 152/243; 24/116 R;
24/230.5 AD; 59/93; 152/172; 152/242
[58] Field of Search ................................. 152/240–243,
152/239, 231, 232, 217, 218, 219, 213 R, 213 A,
222–230, 167, 170–172; 59/86, 93; 403/206,
213; 24/116 R, 201 HE, 225, 230.5 AD, 230.5 TP

[56] References Cited

U.S. PATENT DOCUMENTS 1,460,803 7/1923 Portzer ........................... 152/219 X
4,020,886 5/1977 Daniel ............................ 152/241 X
4,102,378 6/1978 Weidler ............................... 152/243

FOREIGN PATENT DOCUMENTS

DT-AS
1480874 2/1969 Fed. Rep. of Germany .
DT-AS
1605666 4/1971 Fed. Rep. of Germany .
115900 12/1968 Norway .
353862 2/1973 Sweden .

*Primary Examiner*—William A. Powell
*Assistant Examiner*—Thomas Bokan
*Attorney, Agent, or Firm*—Wenderoth, Lind & Ponack

[57] ABSTRACT

An antiskid tire chain comprises a plurality of cross chains which are systematically arranged in groups of three along the tire chain, one end link of each cross chain in a group being joined in a junction member.

4 Claims, 7 Drawing Figures

ANTISKID TIRE CHAIN

BACKGROUND OF THE INVENTION

The present invention relates to antiskid tire chains, e.g. of the type generally indicated in U.S. Pat. No. 4,020,886.

Such tire chains are typically made up of a plurality of sections comprising a row of relatively large steel rings held in place by means of cross chains which in groups of three are arranged along the tire chain, one end link of each of the three cross chains of each group being joined in a junction member from which the cross chains extend in different directions.

In these prior tire chains the junction member is in the form of a closed annular ring or link. Replacing of worn or broken parts in a such tire chain is time-consuming and requires tools as well as welding equipment.

SUMMARY OF THE INVENTION

An object of the present invention is to provide an antiskid tire chain of the general type described above, but having junction members that are constructed in a way permitting easy replacement of defective chain components without the need for recourse to auxiliary tools or equipment.

Another object of the invention is to provide a tire chain having junction members adapted to straight as well as twisted cross links and fitting snugly to the surface of the tire.

According to the invention these objects are achieved by replacing the ordinary closed junction rings by a junction member in the form of an open link defining an internal longitudinal slot and having a slit opening through which the end link of each of the three cross chains has been hooked into the junction member longitudinal slot, the longitudinal slot and the slit opening both having a width equal to or slightly larger than the diameter of the cross links, and the longitudinal slot having a length equal to or slightly larger than three times the cross link diameter, the intermediary one of the hooked-in end links thereby blocking the slit opening against disconnection of the remaining end links.

With such junction members in the tire chain a defective junction member or components associated therewith may be replaced while the chain is situated on the tire of a vehicle, simply by slackening the side chain, removing the defective member or component by slipping the three end links out through the junction member slit opening in a sequence opposite to the assembly procedure, and connecting the desired replacement components into the chain.

BRIEF DESCRIPTION OF THE DRAWINGS

The invention will now be described by way of examples and with reference to the accompanying drawings in which.

DETAILED DESCRIPTION OF THE INVENTION

Figure 1:
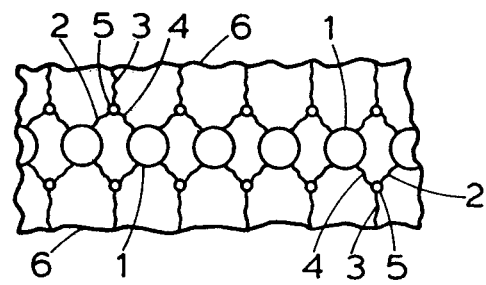
FIG. 1 is a schematic representation of a possible embodiment of a tire chain incorporating the new junction member.

The tire chain generally indicated in FIG. 1 is a so-called "ring chain", i.e. a tire chain of the type described in U.S. Pat. No. 4,020,886, comprising a plurality of identical, relatively large annular steel elements or rings 1 arranged in a spaced relationship centrally along the tire chain. The rings 1 are retained in the chain by means of cross chains which are "star" connected in groups of three cross chains 2, 3, 4 by having one end link of each cross chain in a group joined in junction elements 5 symmetrically arranged on either side of the longitudinal axis of the tire chain, the opposite end link of two of the cross chains 2, 4 in each group being connected to adjacent central rings 1, respectively, while the opposite end link of the third cross chain 3 is connected to the side chain 6, as illustrated in FIG. 1.

Prior art tire chains of the general pattern shown in FIG. 1 have junction members in the form of closed annular steel rings substantially smaller than the central rings 1. When assembling such prior art tire chains the junction member ring is initially open to permit slipping thereinto the three end links of a cross chain group and the junction ring is then permanently closed by welding. Replacement of defective components in tire chains of this prior type is obviously bothersome, requiring tools and welding equipment as it does.

Figure 2:
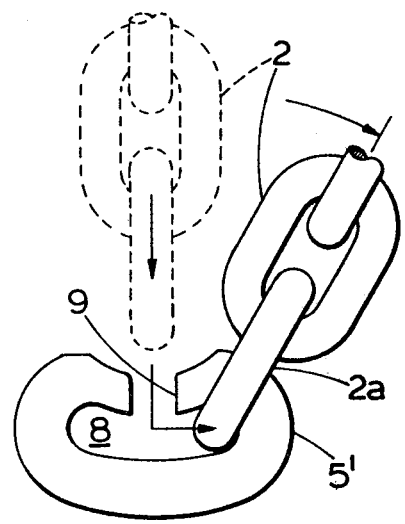
FIGS. 2 through 5 are enlarged elevational views of the junction member, illustrating succesive steps in interconnecting a group of three cross chains thereon.

In a tire chain according to the present invention the junction members are in the form of an open link 5' shown in enlarged elevational view in FIG. 2, defining an internal, longitudinal slot 8 and having in one longitudinal side portion thereof a permanent slit opening 9. The longitudinal slot 8 and the slit opening 9 of the junction member 5' have a width permitting easy hooking in and hooking out of the cross chain end links, and the length of the slot 8 equals or slightly exceeds three end link diameters. Preferably the longitudinal slot 8 is slightly concavely curved relative to the slit opening 9 as seen from the drawings.

FIG. 2 illustrates how the end link 2a of the cross chain 2 is hooked into the longitudinal slot 8 of the junction member 5'. From a position indicated with broken lines the end link 2a is moved endways through the slit opening 9 and then laterally into one end of the longitudinal slot 8 as indicated by arrows, to occupy the position shown with solid lines at the right hand side of the figure. Then the end link 3a of the cross chain 3, the free internal space of which is somewhat larger than the maximum external cross-sectional area of the junction member 5', is threaded laterally onto the junction member 5' as illustrated with broken lines in FIG. 3, until the end link 3a has passed beyond the slit opening 9 and occupies the preliminary position shown with solid lines adjacent the previously inserted end link 2a.

Figure 4:
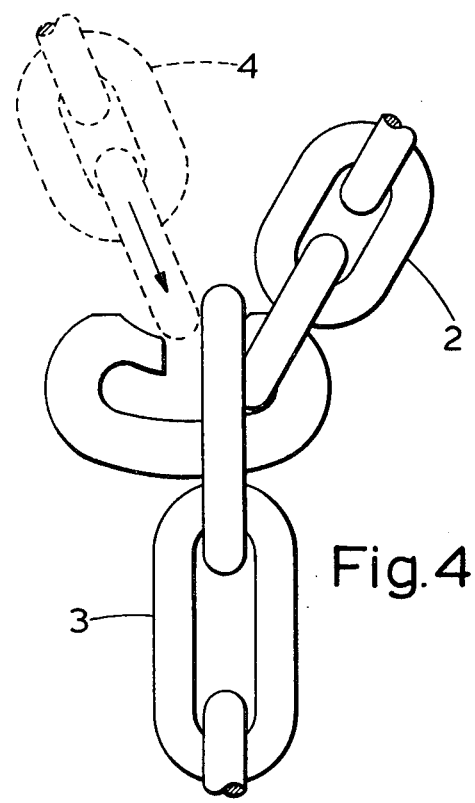

Next, the end link 4a of the remaining cross chain 4 of the group is moved endways into the slit opening 9 as indicated with broken lines in FIG. 4, to occupy the solid line position in the end of the slot 8 opposite the first end link 2a.

Figure 3:
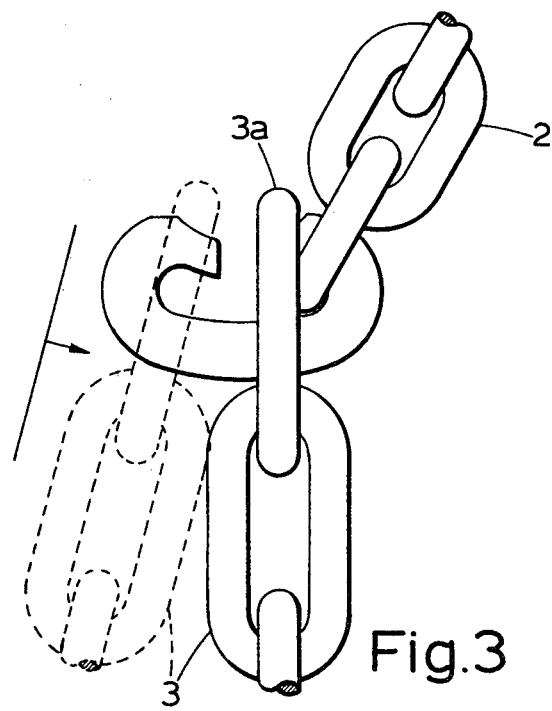
Figure 5:
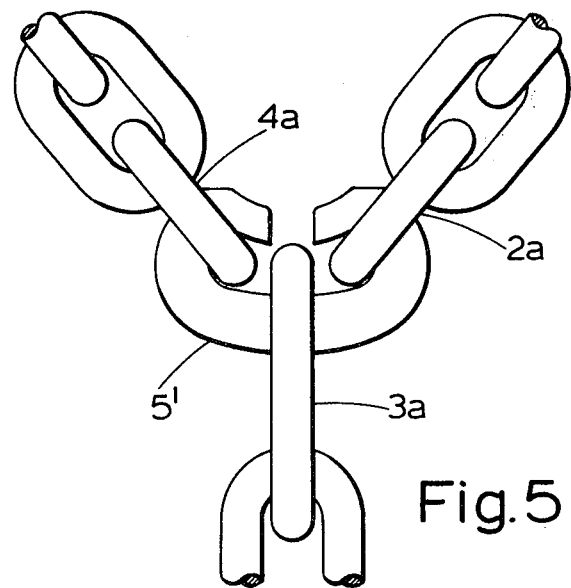

Now the end link 3a can be pulled from its preliminary position illustrated in FIGS. 3 and 4 into the slit opening 9 to occupy the position illustrated in FIG. 5, directly opposite the slit opening 9. Finally the opposite three end links of the group of cross chains 2, 3, 4 are connected to central rings 1 and side chains 6 as described above in connection with FIG. 1, or alternatively, the three cross chains of each group may first be connected to their respective central rings and side chain and then joined through the junction link 5'.

With a tire chain assembled as described above stretched on a tire the middle end link 3a of the cross chain 3 which is directly connected to the side chain 6 will effectively block the slit opening 9 of the open junction link 5' as clearly appearing from FIG. 5, without any possibility of unintentional disconnection of the two outer end links 2a, 4a of the group. If one or more of the loaded components of the tire chain, e.g. one of the large central steel rings 1 is broken or otherwise damaged, the four cross chains 2,2, 4,4, which are connected to the defect ring 1, can be disconnected from their respective junction members 5 in opposite sequence, when first having slackened the side chain 6, after which a replacement ring 1 with associated cross chains 2,2, 4,4 will be connected to their respective junction members 5 as described above. Obviously it will be possible to perform this replacement operation in a very short time and completely without the need of any auxiliary equipment.

The three cross chains 2, 3, 4 illustrated in FIGS. 2 through 5 have been shown as having straight or flat (not twisted) links, and the junction member 5' will be conceived as having a flat configuration. Often however, in a tire chain of the type illustrated in FIG. 1 or similar tire chains, at least the cross chains in the mid or tread portion of the tire chain will have twisted links so as to lie smoothly against the tire. Tests have shown that the junction member 5, in order to efficiently accommodate such twisted chain links with respect to securing a snug and stable position of the chain components against the tire, should have a somewhat curved or bent configuration in a lateral direction.

Figure 6:
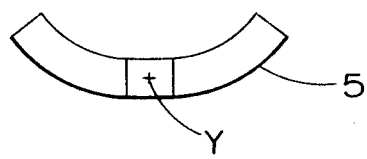
FIG. 6 is a plan view of a preferred embodiment of the junction member.
Figure 7:
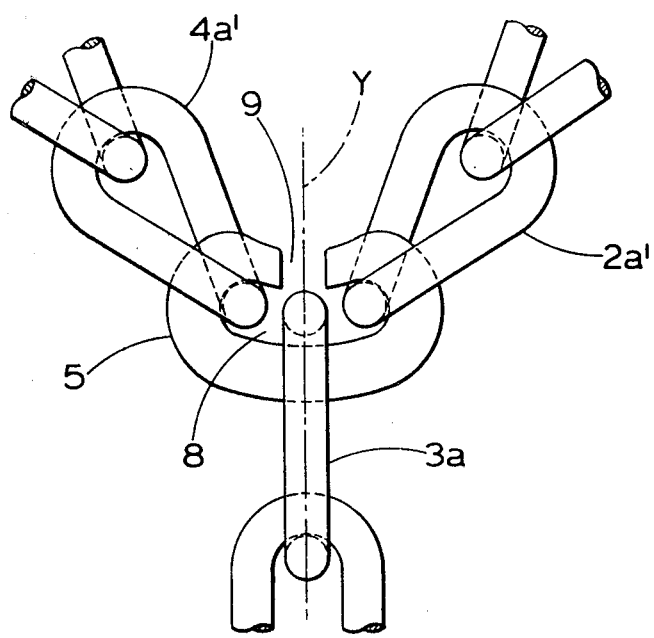
FIG. 7 is an elevational view, similar to FIG. 5, of the junction member of FIG. 6 interconnecting two twisted and one straight chain end links.

Such a curved junction link 5 is depicted in FIG. 6 which is a plan view looking down on the open side portion of the junction link, while in FIG. 7 this curved junction link is shown in elevation, interconnecting the end links 2a', 3a, 4a' of a group of three cross chains, two with twisted links and one with straight links, the end link 3a of the latter chain being situated in the middle, blocking the junction member slit opening 9 for the two other end links 2a', 4a' as described above in connection with FIG. 5. The junction link 5 is curved substantially symmetrical about a central axis Y through the slit opening. In FIG. 6 the lateral curvature of the link is shown as approximating a segment of an elliptical arc with gradually increasing curvature toward the ends of the link. However, the junction link may alternatively be curved according to a circular arc if desired, or any other convenient curve. The actual form and amount of the lateral curvature of the junction member for best results will depend on the dimensions of the type of tire on which the tire chain according to the invention is to be used, and will easily be determined by a skilled person.

The junction links 5 are conveniently punched out from suitable steel plate material, and punched blanks for curved links will have a slightly longer slot 8 than a corresponding flat link to give the curved member the same rectilinear spacing between the slot ends as in a flat member.

It will be appreciated that the present invention is not limited to the antiskid tire chain pattern illustrated in FIG. 1 which is merely an example of a possible configuration of a tire chain incorporating the invention. Thus, any tire chain configuration comprising groups of three cross chains interconnected through an open junction member link 5 as herewithin described will lie within the scope of the invention.

What we claim is:

1. In an antiskid tire chain comprising a plurality of cross chains which are systematically arranged in groups of three along the tire chain, one end link of each cross chain in a group being joined in a junction member from which said cross chains extend in different directions, the improvement of said junction member being in the form of an open link defining an internal longitudinal slot and having a slit opening through which said end link of each of said three cross chains has been hooked into said junction member longitudinal slot, said longitudinal slot and said slit opening both having a width equal to or slightly larger than the diameter of the cross links, and said longitudinal slot having a length equal to or slightly larger than three times the cross link diameter, the intermediary one of said hooked in end links thereby blocking said slit opening against disconnection of the remaining end links.

2. A tire chain according to claim 1, wherein said longitudinal slot in said junction member is concavely curved relative to said slit opening.

3. A tire chain according to claim 2, wherein said junction member is laterally symmetrically curved about a central axis through said slit opening.

4. A tire chain according to claim 3, wherein said lateral curvature approximates a segment of an elliptical arc.

* * * * *